United States Patent [11] 3,589,687

[72] Inventor Allen E. Leybourne III
 Decatur, Ala.
[21] Appl. No. 786,110
[22] Filed Dec. 23, 1968
[45] Patented June 29, 1971
[73] Assignee Monsanto Company
 St. Louis, Mo.

[54] PACKING ELEMENT
 7 Claims, 4 Drawing Figs.
[52] U.S. Cl.................................................... 261/79,
 261/94, 23/284
[51] Int. Cl.................................................... B01f 3/02,
 B01f 3/04, B01f 3/08
[50] Field of Search............................................ 259/97,
 105; 261/79, 79.1; 210/150; 261/94—98

[56] References Cited
UNITED STATES PATENTS
| 906,555 | 12/1908 | Pein | 261/75 |
| 1,293,270 | 2/1919 | Webb | 261/95 |
| 2,761,657 | 9/1956 | Rietz | 259/97 |

Primary Examiner—Tim R. Miles
Assistant Examiner—Steven H. Markowitz
Attorneys—Robert L. Broad, Jr. and Neal T. Willis ABSTRACT: A packing element to be used in a reactor or mass transfer device wherein gas-gas, gas-liquid, and liquid-liquid phenomena are involved. The element is comprised of a housing having positioned therein adjacent the walls a first helical member of one hand, and a second helical member of opposite hand positioned within the first helical member.

PATENTED JUN 29 1971 3,589,687

INVENTOR.
A. E. LEYBOURNE III
BY
ATTORNEY

PACKING ELEMENT

BACKGROUND OF THE INVENTION

1. Field of the Invention

This relates generally to packed columns and more specifically to elements which comprise the packing within such columns.

2. Description of the Prior Art

Packed columns and their contained packing have been known and used for some time. The contained packing has assumed many structural shapes with corresponding advantages, all of which have been balanced with effectiveness, economics, ease of maintaining, etc.

When dumped packing is considered the above-mentioned factors also come into play with effectiveness being a major area of concern. By dumped packing is meant the dumping of packing elements within a column in a random manner as opposed to particularly positioning same within the column.

SUMMARY OF THE INVENTION

It has now been found that by constructing packing elements in the form of hollow cylinders, being housings, having positioned therein adjacent the walls a first helical member of one hand and a second helical member of opposite hand positioned within the first, highly effective packing elements are produced which may be used either as dumped or particularly positioned packing.

DESCRIPTION OF THE PREFERRED EMBODIMENT

Figure 2:
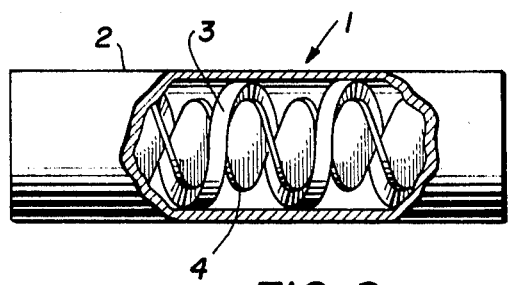
FIG. 2 is an elevation view, partially broken away, showing the packing element of this invention.

In accordance with this invention, a packing element shown in FIG. 2 and generally denoted by reference numeral 1 is made up of a housing 2 which is preferably a hollow cylindrical member comprised of suitable material. Housing 2 has disposed therein adjacent its inner wall a left-handed helical member 3 extending the length thereof. Although it is not necessary for member 3 to extend the length of housing 2, no useful purpose if visualized for having a partially empty housing. Within helical member 3 is disposed a right-handed helical member 4 which also extends the length of housing 2. The labels as to hand are only for purposes of distinction with opposite hands being all that is required.

Figure 1:
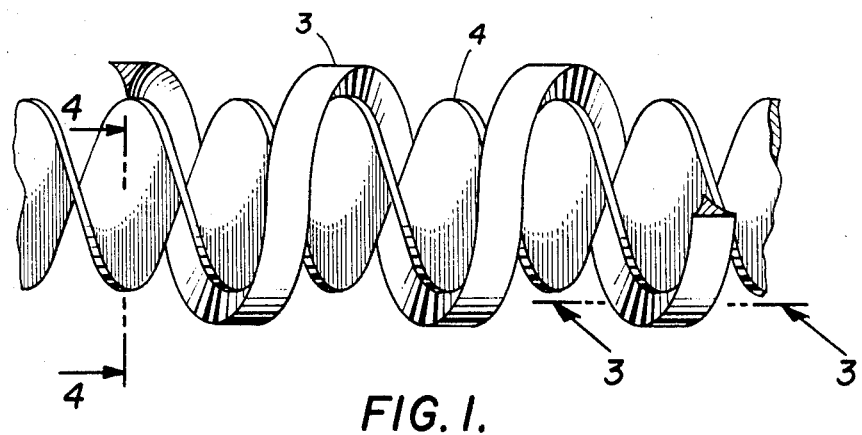
FIG. 1 is an elevation view showing a preferred embodiment of sections of helixes used in a packing element according to this invention.

The difference between the inside diameter of first helical member 3 and the outside diameter of second helical member 4 may be either positive or negative as long as the material to be handled in the column can pass through the packing element. FIG. 1 depicts one situation wherein the difference is substantially zero.

Figure 3:
FIG. 3 is a cross-sectional view taken substantially along lines 3–3 of FIG. 1.
Figure 4:
FIG. 4 is a cross-sectional view taken substantially along lines 4–4 of FIG. 1.

The optimum shape of first helical member 3 is believed to be coiled and springlike having a substantially triangular cross section as shown in FIG. 3. The optimum shape for a second helical member 4 is believed to be the form of a twisted ribbon having a substantially rectangular cross section as shown in FIG. 4.

The term substantially triangular cross section is meant to include the embodiment shown in FIG. 3 wherein the two surfaces not adjacent the walls of the housing are arcuate.

The cross section of first helical member 3 can also be round, square, etc., while the cross section of the second helical member 4 can vary widely and can even assume the shape of a commercially obtained twist bit.

The theory behind the above-mentioned optimum shapes and the effect of the packing element in general is that the characteristic flow profiles of the material to be handled in a straight unobstructed duct remains unchanged from one point to another along the path of transfer. This is particularly true when viscous liquids are considered. Such liquids start against the walls of the duct and remain against the walls; there being nothing to change this situation.

When transfer of material through a helically shaped duct is considered, slippage occurs adjacent the walls. This helical flow path will lag the path of the helical duct generating a pseudodisplacement and/or slippage of apparent contrary hand to that of the helical duct. This being the case, and the desire to be economical, means have been sought to provide the same situation in packed columns and in particular, within the packing elements contained in the columns. The positioning of a helical member adjacent the walls of a hollow cylinder will solve some of the difficulties, but not all, because the material adjacent the helical member will intermingle and mix with itself. To effect mixing and intermingling with the material in the vicinity of the center of the duct, a second helical member of opposite hand can be positioned interior of the first helical member.

To arrive at optimum shapes of the helical members, several factors have to be taken into account. The helical transfers of material should be as close together as possible for effective mixing and/or intermingling. To provide this, there must in essence be a duct with a rod through the center, concentric rod and duct, or duct having solid center in order that material flow will be maintained away from the center. Around this solid center or rod, the distribution of the helical flows must be considered. Two separate flows of circular cross section would provide little or no intermingling and mixing except that produced by any turbulence that is present, whereas cooperating semicircular flows would provide excellent mixing. The cross-sectional surfaces generated by cooperating semicircular helical flows would substantially assume the configurations shown in FIGS. 3 and 4.

The cooperation of the first and second helical members can be appreciated from viewing FIGS. 3 and 4, where in operation these members are stationary and as the material enters the packing element, it experiences tumbling, twisting, etc. and becomes intermingled and/or mixed with itself. This intermingling and mixing aids in keeping a greater quantity of material away from any one place, such as the walls, and aids in reducing undesirable results and insufficient surface generation.

It is to be appreciated that a packing element according to this invention can be utilized and substituted for most any packing element presently available.

When substituted for presently available packing elements, not only are most, if not all, of the advantages of the replaced elements retained, due to the exterior structure, but the added advantages present due to the interior structure are also provided.

The foregoing illustrates the essential features of the invention as well as some of the manners in which it may be practiced. Various changes and modifications may be made in practicing the invention without departing from the spirit and scope thereof, and therefore, the invention should not be limited except as defined in the appended claims.

I claim:

1. A packing element adapted for use in a packed column comprising a housing having open ends, said housing having therein a first helical member of one hand, and a second helical member disposed within the first helical member and being of a hand opposite the hand of the first helical member, said helical members being stationary within said housing.

2. A packing element according to claim 1 wherein the shape of the first helical member is substantially that of a coil spring.

3. A packing element according to claim 1 wherein the shape of the second helical member is substantially that of a twisted ribbon.

4. A packing element according to claim 1 wherein the outer periphery of the first helical member is positioned adjacent the inside wall of the housing.

5. A packing element adapted for use in a packed column comprising a housing having open ends and having disposed therein:
   a. a spring-shaped helical member of one hand, the outer periphery of which is positioned adjacent the inside wall of the housing, and
   b. a twisted ribbon-shaped helical member of an opposite hand disposed within the spring-shaped helical member, said helical member being stationary within said housing.

6. A packing element according to claim 5 wherein the spring-shaped helical member has a substantially triangular cross section.

7. A packing element according to claim 5 wherein the twisted ribbon-shaped helical member has a substantially rectangular cross section.